(12) United States Patent
Arambepola et al.

(10) Patent No.: US 8,743,977 B2
(45) Date of Patent: Jun. 3, 2014

(54) EFFICIENT TUNING AND DEMODULATION TECHNIQUES

(75) Inventors: Bernard Arambepola, Enfield (GB); Nick Cowley, Wroughton (GB)

(73) Assignee: Intel Corporation, Santa Clara, CA (US)

( * ) Notice: Subject to any disclaimer, the term of this patent is extended or adjusted under 35 U.S.C. 154(b) by 857 days.

(21) Appl. No.: 12/456,894

(22) Filed: Jun. 23, 2009

(65) Prior Publication Data

US 2010/0322326 A1 Dec. 23, 2010

(51) Int. Cl.
*H04K 1/10* (2006.01)
(52) U.S. Cl.
USPC .......................................... 375/260; 375/259
(58) Field of Classification Search
USPC ........................................................ 375/260
See application file for complete search history.

(56) References Cited

U.S. PATENT DOCUMENTS

| | | | | |
|---|---|---|---|---|
| 5,612,975 A * | 3/1997 | Becker et al. | | 375/319 |
| 6,240,150 B1 * | 5/2001 | Darveau et al. | | 375/350 |
| 6,359,938 B1 * | 3/2002 | Keevill et al. | | 375/316 |
| 6,614,849 B1 * | 9/2003 | Chan et al. | | 375/259 |
| 6,633,552 B1 * | 10/2003 | Ling et al. | | 370/318 |
| 6,738,608 B2 * | 5/2004 | Black et al. | | 455/260 |
| 6,833,875 B1 * | 12/2004 | Yang et al. | | 348/665 |
| 6,915,225 B2 * | 7/2005 | Jorgensen | | 702/77 |
| 7,853,021 B2 * | 12/2010 | Lei et al. | | 381/2 |
| 7,903,772 B2 * | 3/2011 | Jensen | | 375/350 |
| 7,916,797 B2 * | 3/2011 | Yu et al. | | 375/260 |
| 8,014,476 B2 * | 9/2011 | Filipovic et al. | | 375/344 |
| 8,068,530 B2 * | 11/2011 | Khandekar et al. | | 375/130 |
| 2001/0055319 A1 * | 12/2001 | Quigley et al. | | 370/480 |
| 2002/0065047 A1 * | 5/2002 | Moose | | 455/63 |
| 2003/0186666 A1 * | 10/2003 | Sindhushayana | | 455/260 |
| 2006/0176989 A1 * | 8/2006 | Jensen | | 375/350 |
| 2007/0098114 A1 * | 5/2007 | Hundhausen et al. | | 375/326 |
| 2007/0104298 A1 * | 5/2007 | Filipovic et al. | | 375/344 |
| 2008/0114252 A1 * | 5/2008 | Randall et al. | | 600/447 |
| 2008/0240230 A1 * | 10/2008 | Oxman et al. | | 375/240.01 |
| 2009/0128379 A1 * | 5/2009 | Rosenthal et al. | | 341/61 |
| 2010/0158178 A1 * | 6/2010 | Sobchak et al. | | 375/355 |
| 2010/0246556 A1 * | 9/2010 | Kaneko et al. | | 370/343 |
| 2010/0286527 A1 * | 11/2010 | Cannon et al. | | 600/459 |

\* cited by examiner

*Primary Examiner* — Santiago Garcia
(74) *Attorney, Agent, or Firm* — Sutherland Asbill & Brennan LLP

(57) ABSTRACT

Techniques for the reception and processing of wireless signals are disclosed. For instance, an apparatus may include a first hardware module (e.g., a mixed signal module) and a second hardware module (e.g., a digital signal module). The first hardware module may convert an analog signal corresponding to a received wireless signal into a digital signal having a first sampling rate. In turn, channel filtering may be performed on this digital signal. Following this, the filtered digital signal may be resampled from the first sampling rate to a second sampling rate. At this point, the resampled signal may be transferred across an interface from the first hardware module to the second hardware module. Upon receipt, the second hardware module may correct a sampling rate error in the second sampling rate, and demodulate the digital signal into one or more symbols.

20 Claims, 5 Drawing Sheets

EFFICIENT TUNING AND DEMODULATION TECHNIQUES

BACKGROUND

Devices that receive digital television signals typically include tuner and demodulator portions. The tuner portion receives a radio frequency (RF) signal at a first frequency range and generates an intermediate signal at a second (e.g., a lower) frequency range. In turn, the demodulator portion processes the second signal into symbols that convey video images and/or audio.

Various demodulation techniques may be employed in the generation of such streams. As an example, digital video broadcasting terrestrial (DVB-T) and digital multimedia broadcast-terrestrial/handheld (DMB-T/H) standards employ orthogonal frequency division multiplexing (OFDM) techniques.

Current digital TV demodulator portions include mixed signal circuitry that includes, for example, analog-to digital converters (ADC) and digital demodulation circuitry. However, various drawbacks exist for mixed signal demodulator implementations. For example, some fine-geometry technologies may not support mixed-signal implementations. Also, mixed-signal implementations do not scale as well as digital circuits. Consequently, mixed-signal implementations may require a disproportional share of silicon devices.

Moreover, demodulation is becoming increasingly complex due to video standards that employ advanced modulation and channel coding schemes. Further, many digital television standards exist, (terrestrial, satellite, etc) with differing ADC requirements. Such complexities and variety of standards become progressively more difficult to implement in mixed signal arrangements.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Embodiments provide techniques for the reception and processing of wireless signals. For instance, an apparatus may include a first hardware module and a second hardware module. The first hardware module may be a mixed signal module, while the second hardware module may be a digital module. In addition, the apparatus may include an interface between the first and second hardware modules.

The first hardware module may receive a wireless signal, and convert a corresponding analog signal into a digital signal having a first sampling rate. In turn, the first hardware module may perform channel filtering on this digital signal. Following this, the first hardware module may sample the filtered digital signal from the first sampling rate to a second sampling rate. At this point, the resampled signal may be transferred across the interface to the second hardware module.

Upon receipt of the resampled signal, the second hardware module may correct a sampling rate error in the second sampling rate, and demodulate the digital signal into one or more symbols. Through the employment of such techniques, flexible and efficient implementations for the tuning and demodulating of signals may be achieved.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
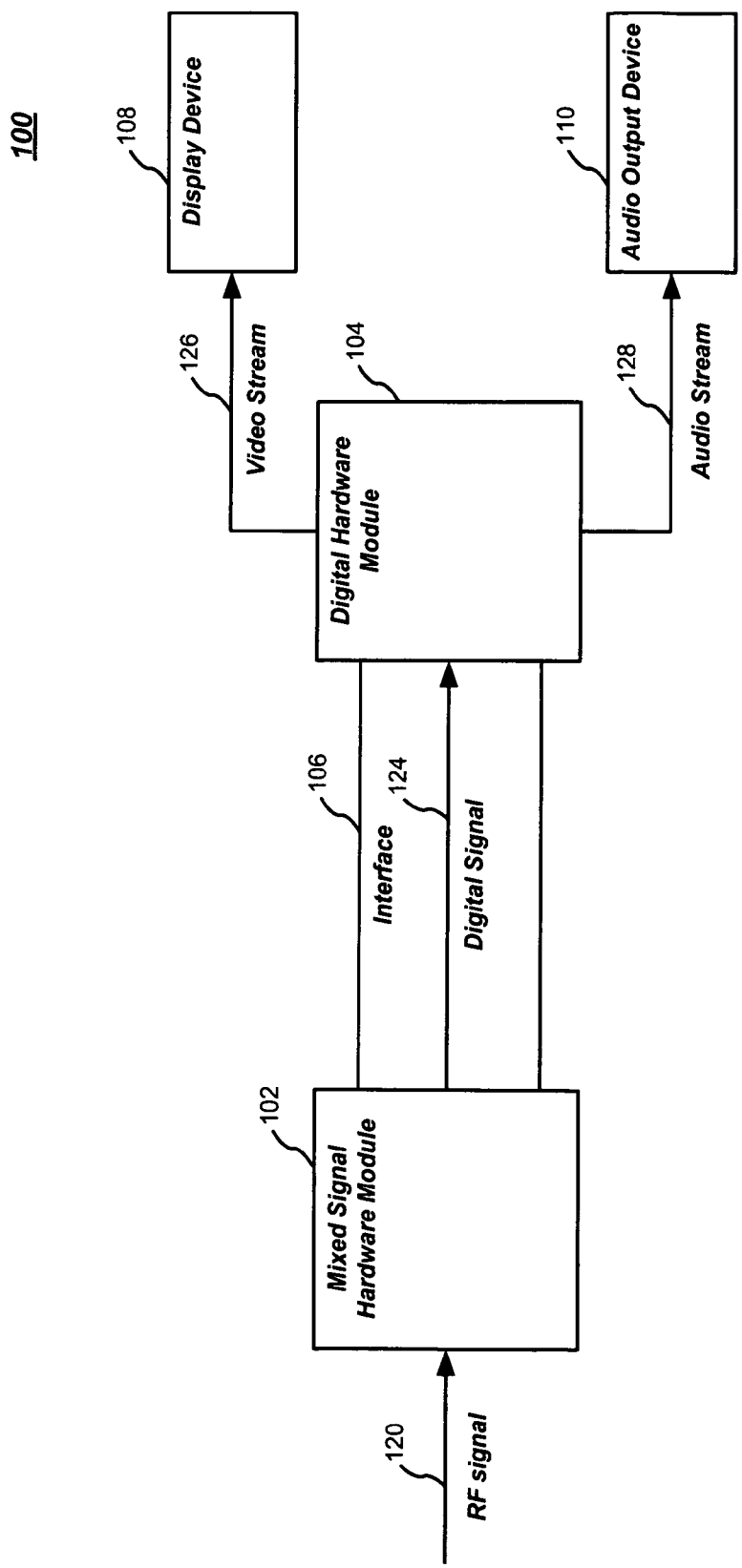
FIG. 1 is a diagram of an implementation framework.

FIG. 1 is a diagram of an implementation framework 100 that embodiments may employ in the reception and processing of RF signals into digital data streams. This framework includes two hardware modules: a mixed signal hardware module 102, a digital hardware module 104, and an interface 106.

Mixed signal hardware module 102 may include various combinations of analog and/or digital circuit elements. These elements may be implemented with a mixed signal technology. Mixed signal technologies may employ various semiconductor processes, including (but not limited to) CMOS, Bipolar, BiCMOS, and GaAs.

Further, the elements of hardware module 102 may be implemented with one or more integrated circuits (ICs) and/or one or more discrete components. The IC(s) and/or discrete component(s) may be arranged on a substrate, such as a printed circuit board (PCB). Embodiments, however, are not limited to such arrangements.

As shown in FIG. 1, mixed signal hardware module 102 receives an analog radio frequency (RF) signal 120. This signal may be a wireless signal received through one or more antennas (not shown). Based on RF signal 120, the elements of mixed signal hardware module 102 perform various operations. These operations produce a digital signal 124 that is provided to digital hardware module 104.

Digital hardware module 104 may include one or more processors and/or digital circuitry to generate symbols from digital signal 124. Such symbols may convey video and/or audio streams (e.g., encoded streams). Exemplary processors include (but are not limited to) general purpose microprocessors, digital signal processors (DSPs), and/or hardware accelerator components. In embodiments, digital hardware module 104 is implemented in a digital (non mixed signal) technology. Digital technologies may employ various semiconductor processes, including (but not limited to) CMOS, Bipolar, BiCMOS, and GaAs. In embodiments, digital hardware module 104 may comprise one or more digital integrated circuits. These IC(s) may be arranged on a substrate, such as a PCB.

Interface 106 provides for the exchange of digital signals between mixed signal hardware module 102 and digital hardware module 104. Accordingly, FIG. 1 shows that mixed signal hardware module 102 provides digital hardware module 104 with these digital signal(s) through interface 106. Interface 106 may be implemented in various ways. For example, interface 106 may include a serial interface (such as a universal serial bus (USB) interface), a parallel interface, and/or other suitable interfaces.

As described above, digital hardware module 104 may generate symbols that convey content (e.g., video and/or audio streams). As an example, FIG. 1 shows digital hardware module 104 providing a video stream 126 to a display device 108, and an audio stream 128 to an audio output device 110. Exemplary display devices include cathode ray tubes (CRTs), light emitting diode (LED) displays, liquid crystal displays (LCDs), plasma displays, and so forth. Exemplary audio output devices include one or more speakers.

Figure 2:
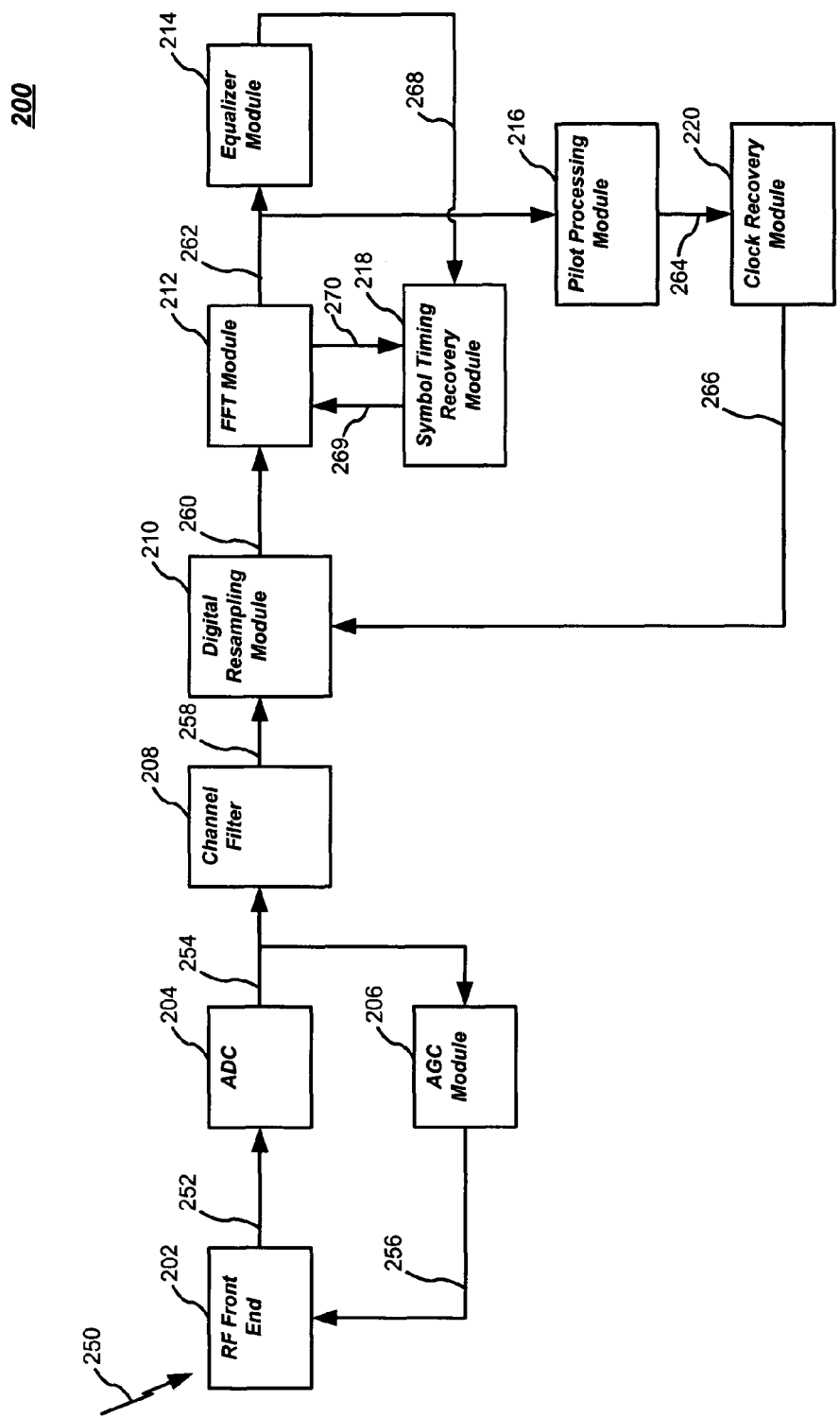
FIG. 2 is a diagram of an exemplary implementation.

FIG. 2 is a diagram of an implementation 200 that may be employed in the context of FIG. 1. More particularly, implementation 200 includes various elements that may be allocated in various ways among hardware modules 102 and 104 of FIG. 1. For example, FIG. 2 shows implementation 200 including a radio frequency (RF) front end 202, an analog to digital converter (ADC) 204, an automatic gain control (AGC) module 206, a channel filter 208, a digital resampling module 210, a fast fourier transform (FFT) module 212, an equalizer module 214, a pilot processing module 216, a symbol timing recovery module 218, and a clock recovery module 220. These elements may be implemented in any combination of hardware and/or software.

RF front end 202 receives a wireless radio frequency (RF) signal 250. In turn, RF front end 202 produces an analog signal 252, which is sent to ADC module 204. This generation of analog signal 252 from RF signal 250 may involve various operations, such as wireless signal reception, downconversion, amplification, and/or filtering. Accordingly, RF front end 202 may include electronic components (e.g., circuitry), such as any combination of antennas, mixers, amplifiers, filters, and so forth.

Upon receipt of analog signal 252, ADC 204 generates a corresponding digital signal 254. Digital signal 254 represents values (e.g., voltage levels) of analog signal 252 with corresponding discrete digital values. In generating digital signal 254, ADC 204 may employ a variety of sampling techniques and rates. Moreover, ADC 204 may employ a variety of circuit implementation structures.

ADC 204 may sample analog signal 252 at a rate much higher than the minimum required rate (i.e., the Nyquist rate). This is done so that subsequent digital channel filtering (performed by channel filter 208) achieves substantial adjacent channel interference cancellation. This feature is desirable, for example, in situations where undesired adjacent channels have comparatively high power levels. For instance, certain digital video situations may involve undesired adjacent channels having levels that are 30-40 dB higher than the desired channel.

As shown in FIG. 2, digital signal 254 is sent to AGC module 206, and to channel filter 208. AGC module 206 regulates the power level of analog signal 252. More particularly, AGC module 206 generates a gain control feedback signal 256 based on characteristics of digital signal 254 (e.g., based on its power characteristics). FIG. 2 shows that gain control feedback signal 256 is sent to RF front end 202. Upon receipt, element(s) within RF front end 202 (e.g., a variable gain amplifier (VGA)) are adjusted so that analog signal 252 is at a desired power level.

FIG. 2 shows that channel filter 208 generates a digital signal 258 from digital signal 254. In particular, channel filter 208 filters out energy from non-selected channels (e.g., adjacent channels) in digital signal 254. Also, channel filter 208 may implement an automatic gain control feature that regulates the energy characteristics of digital signal 258. In embodiments, features of channel filter 208 may be implemented through digital signal processing techniques. However, other techniques may be employed.

Digital resampling module 210 changes the sampling rate of digital signal 258. This may be done to provide a sampling rate that is suitable for demodulation. In embodiments, digital resampling module 210 may generate a resampled digital signal 260 having a lower sampling rate than that of digital signal 258. This sampling rate is determined by a clock signal 266. Details regarding the generation of clock signal 266 are provided below.

As shown in FIG. 2, resampled digital signal 260 is sent to FFT module 212, which performs a fast fourier transform on resampled digital signal 260. Through this transform, OFDM demodulation is performed. As a result, FFT module 212 produces a symbol sequence 262. From this symbol sequence, content streams (e.g., video and/or audio) may generated for output to a user through one or more devices (e.g., displays and/or speakers). In embodiments, such generation may involve various operations, including (but not limited to) equalization and/or decoding.

FIG. 2 shows that symbol sequence 262 is sent to pilot processing module 216 and equalizer module 214. OFDM transmissions usually employ embedded pilot signals that are typically spaced in frequency and time according to predetermined patterns. Pilot processing module 216 processes such pilot signals within symbol sequence 262. From these pilot signals, pilot processing module 216 may determine timing and frequency characteristics of pilots within symbol sequence 262. Based on these determinations, pilot processing module 216 generates one or more timing indicator(s) 264, which are sent to clock recovery module 220.

From timing indicator(s) 264, clock recovery module 220 determines a sampling rate to be employed by digital resampling module 210. In turn, clock recovery module 220 generates clock signal 266, which indicates this sampling rate to digital resampling module 210. In embodiments, clock recovery module 220 may include a numerically controlled oscillator (NCO) to generate clock signal 266. However, other implementations may be employed.

As described above, equalizer module 214 also receives symbol sequence 262. Equalizer module 214 provides corrections for irregular frequency response characteristics. This may involve determining one or more channel characteristics from, for example, pilot signals. Exemplary channel characteristics include (but are not limited to) channel frequency response (CFR) and/or channel impulse response (CIR). As shown in FIG. 2, equalizer module 214 provides such channel characteristic(s) 268 to symbol timing recovery module 218.

Symbol timing recovery module 218 determines trigger points for FFT module 212 to commence FFT operations so that correct frequency-domain symbols are obtained. These trigger points are determined from channel characteristic(s) 268, as well as from a symbol timing indicator 270 that is received from FFT module 212. In turn, symbol timing recovery module 218 generates trigger signal 269. Trigger signal 269 controls the symbol timing employed by FFT module 212.

Figure 3:
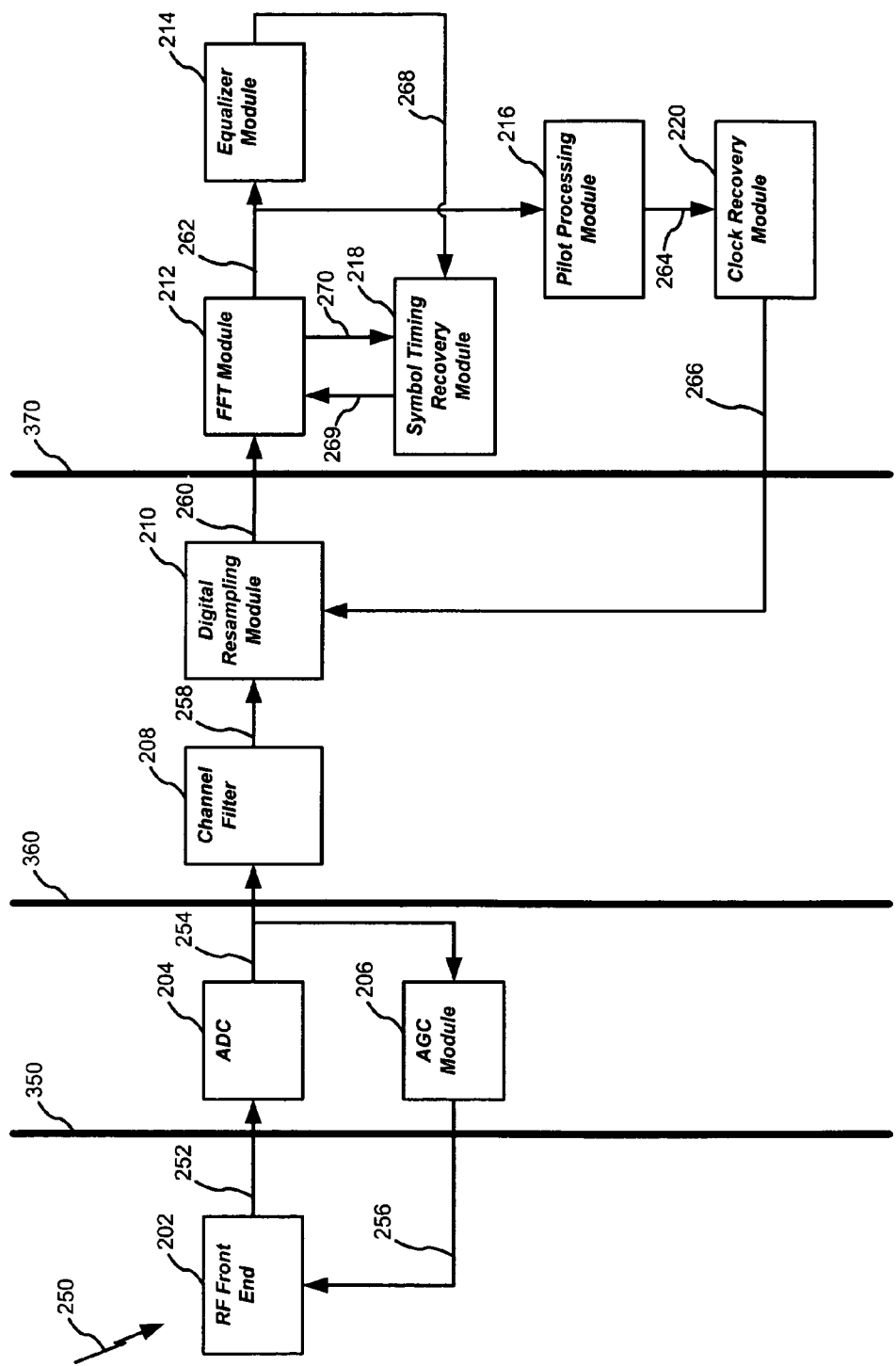
FIG. 3 is a diagram showing various allocations among hardware portions.

As described above, the elements of FIG. 2 may be allocated among hardware modules 102 and 104 in various ways. FIG. 3 shows three exemplary allocations that are demarcated by boundary lines. In particular, FIG. 3 shows a first allocation demarcated by a boundary line 350, a second allocation demarcated by a boundary line 360, and a third allocation demarcated by a boundary line 370. For each of these boundary lines, elements on the line's left side are included in hardware module 102, while elements on the line's right side are included in hardware module 104. These allocations are discussed below.

For the allocation of line 350, RF front end 202 is included within hardware module 102, while the remaining elements of implementation 200 are included within hardware module 104. Unfortunately, with reference to FIG. 1, this allocation increases implementation complexity by requiring an analog signal (analog signal 252) to be passed across interface 106.

According to the allocation of line 360, RF front end 202, ADC 204, and AGC module 206 are included within hardware module 102, while the remaining elements of implementation 200 are included within hardware module 104. In contrast with this allocation indicated by line 350, this allocation places ADC 204 within hardware module 102. As described above, ADC 204 may employ a sampling rate that is much higher than the minimum required rate. Thus, this allocation may unfortunately require interface 106 (between hardware modules 102 and 104) to support a very high bit rate to accommodate digital signal 254. This may introduce undesirable complexities.

For the allocation of line 370, RF front end 202, ADC 204, AGC module 206, channel filter 208, and digital resampling module 210 are included within hardware module 102, while the remaining elements of implementation 200 are included within hardware module 104.

As this allocation places digital resampling module 210 within hardware module 102, interface 106 does not have to support a very high bit rate. However, to convey clock signal 266, this allocation places requires a feedback path from hardware module 104 to hardware module 102. Such a feedback path may be inconvenient and/or impractical, especially for software-based demodulator implementations, to provide a real-time feedback.

Figure 4:
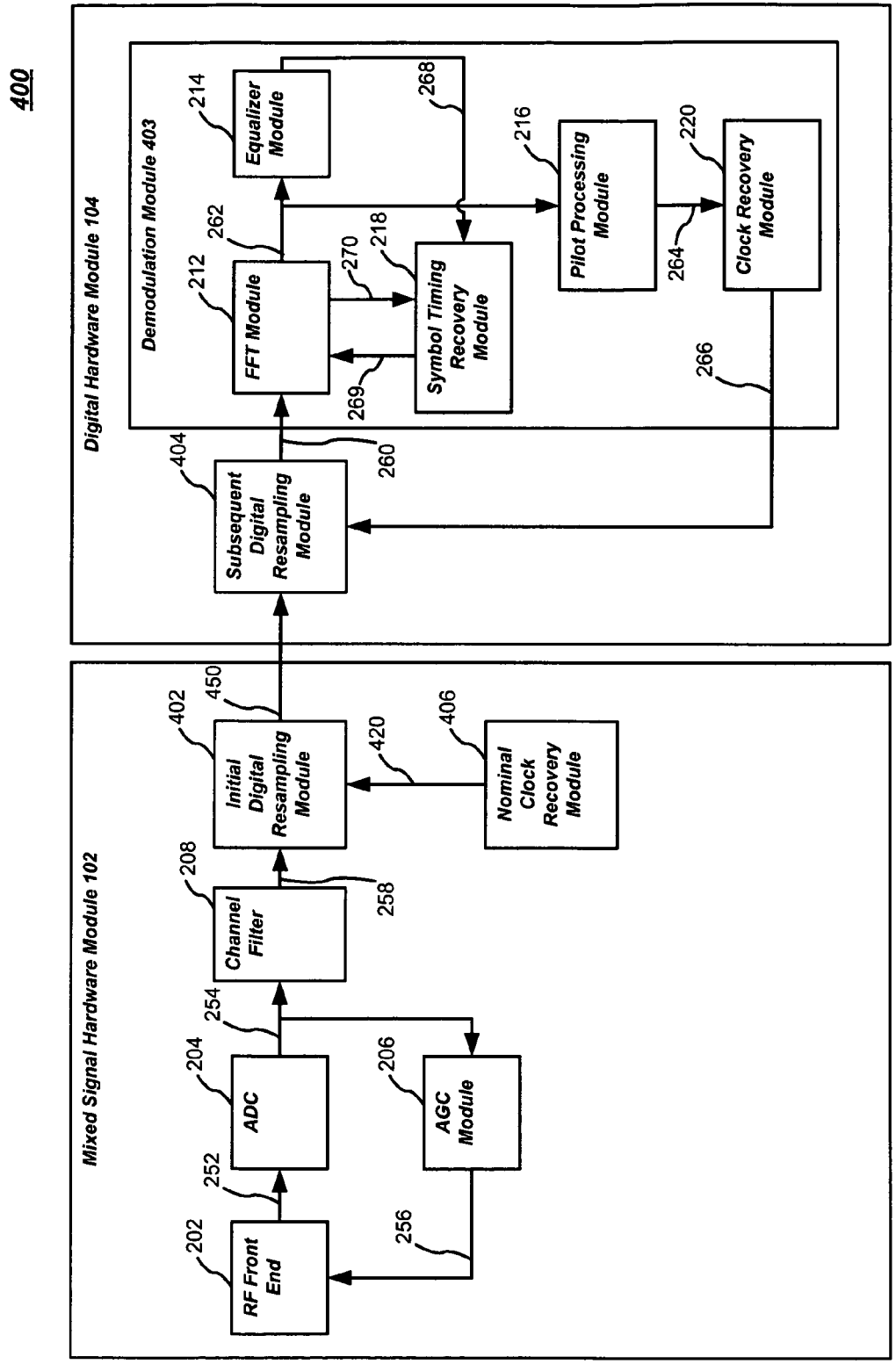
FIG. 4 is a diagram showing a further exemplary implementation.

FIG. 4 is diagram of an implementation 400 that is similar to implementation 200 of FIG. 2. Like implementation 200, implementation 400 of FIG. 4 may be employed in the context of FIG. 1. Implementation 400 may include various elements. These elements may be implemented in any combination of hardware and/or software.

Some of these elements may be the same or similar to those described above with reference to FIG. 2. For example, FIG. 4 shows implementation 400 including RF front end 202, ADC 204, AGC module 206, and channel filter 208.

Also, FIG. 4 shows a demodulation module 403. For purposes of illustration, demodulator module 403 includes elements of FIG. 2. In particular, FIG. 4 show demodulator module 403 including FFT module 212, equalizer module 214, pilot processing module 216, symbol timing recovery module 218, and clock recovery module 220. These elements are shown for purposes of illustration, and not limitation. Thus, other elements may be employed.

Unlike the implementation of FIG. 2, the implementation of FIG. 4 includes two resampling stages. In particular, FIG. 4 shows an initial digital resampling module 402 and a subsequent digital resampling module 404. Also, implementation 400 further includes a nominal clock recovery module 406. These resampling modules may be implemented in various ways (e.g., with Farrow structures). However, other implementations may be employed.

Initial digital resamping module 402 produces a resampled digital signal 450, which is transferred to subsequent digital sampling module 404 across an interface (e.g., interface 106 of FIG. 1). In turn, subsequent digital sampling module 404 produces digital signal 260, as described above with reference to FIG. 2.

As described above, the elements of FIG. 4 may be allocated in various ways among hardware modules 102 and 104 of FIG. 1. Also, through the employment of multiple resampling stages, this implementation may achieve a more desirable allocation among hardware modules. Accordingly, FIG. 4 shows an allocation between hardware module 102 and hardware module 104.

More particularly, the allocation of FIG. 4 provides features that may be advantageous over the various allocations shown in FIG. 3. For instance, the allocation shown in FIG. 4 does not require feedback from hardware module 104 to hardware module 102. Also, initial digital resampling module 402 advantageously reduces the bit rate that needs to be supported by interface 106.

As shown in FIG. 4, initial digital resampling module 402 is not driven by a feedback loop. Instead, initial digital resampling module 402 is driven by nominal clock recovery module 406 (which is included in hardware module 102). In embodiments, nominal clock recovery module generates a sampling rate clock signal 420 that is derived from an oscillator (not shown), such as a crystal oscillator, within hardware module 102.

Since module 402 is not driven by a feedback loop, an error in its sampling rate may occur. For example, if initial digital resampling module 402 is being driven by a crystal oscillator having a tolerance of 50 parts per million (ppm), then resampled digital signal 450 may have a sampling rate error as great as 50 ppm.

In embodiments, such sampling rate errors in resampled digital signal 450 are corrected by subsequent digital resampling module 404 (which produces signal 260). More particularly, such errors are corrected by a feedback loop. As described above with reference to FIG. 2, the feedback loop may include pilot processing module 216, and clock recovery module 220.

Subsequent digital resampling module 404 may be implemented in various ways. One implementation may include a static upsampling module (e.g., a rate doubler) followed by a variable rate resampling module that performs rate adjustments based on clock signal 266. These elements may be implemented in any combination of hardware and/or software.

For example, the upsampling module may be fixed-coefficient (e.g., 20-tap) symmetric finite impulse response (FIR) interpolator. The variable rate resampling module may be implemented using a Farrow structure. However, other implementations may be employed. Moreover, implementations that do not include a rate doubler (or static upsampling module) may be employed.

As described above, embodiments may be employed in digital video systems. Further, ADC 204 may generate digital signals at a high sampling rate so that channel filter 208 may achieve desirable adjacent channel interference cancellation.

For example, considering an exemplary 8 MHz DVB-T implementation, a sampling rate of approximately 45 MHz may be employed (for intermediate frequency (IF) reception), and a sampling rate of approximately 40 MHz may be employed (for zero-IF reception). If ADC module 204 generates 10-bit samples, then these sampling rates yield bit rates of approximately 450 megabits per second (for IF reception) and 400 megabits per second (for zero-IF reception).

In the context of FIG. 1, employing such bit rates across interface 106 requires an increase in the capacity of interface 106. However, initial digital resampling module 402 advantageously avoids the need for such increased capacity by reducing this sampling rate to approximately 64/7 MHz (which corresponds to approximately 91.43 megabits per second).

Figure 5:
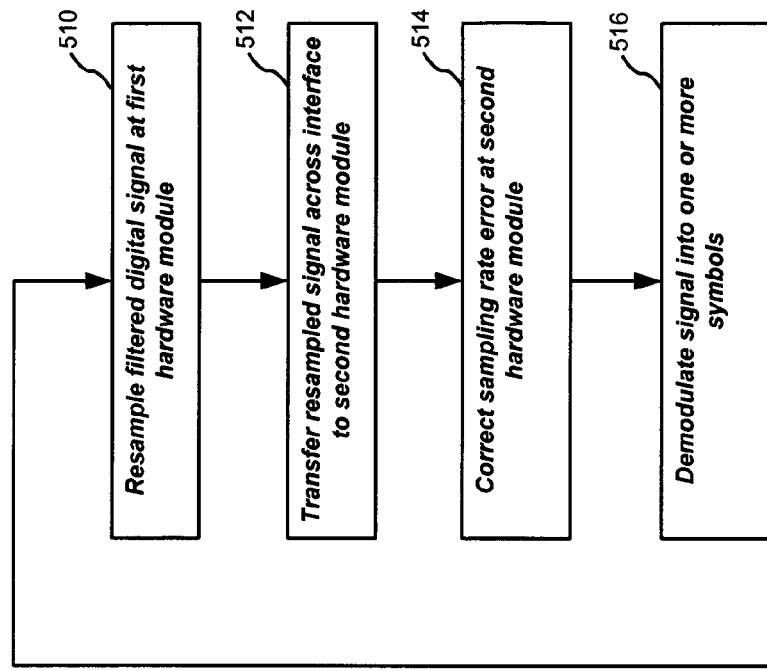
FIG. 5 is a logic flow diagram.
Figure 5:
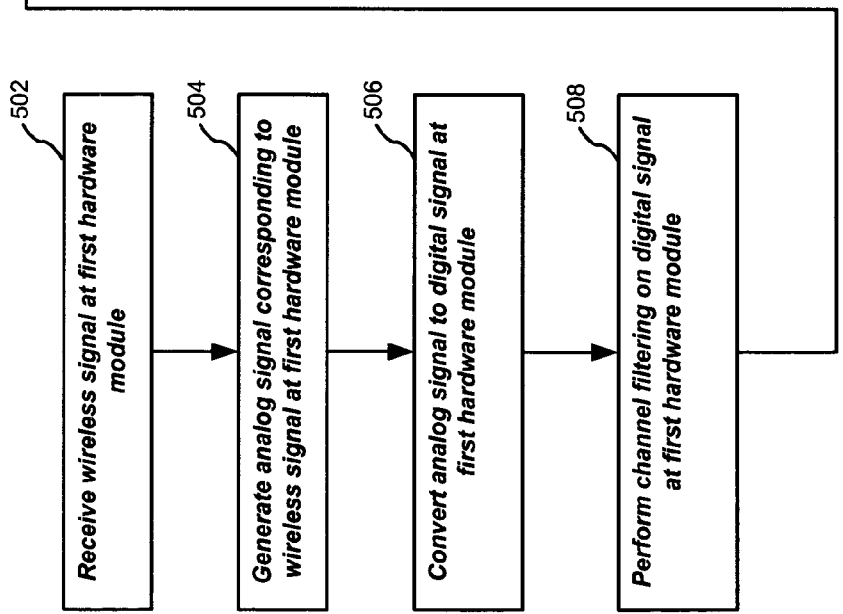

FIG. 5 illustrates an embodiment of a logic flow. In particular, FIG. 5 illustrates a logic flow 500, which may be representative of the operations executed by one or more embodiments described herein. Although FIG. 5 shows a particular sequence, other sequences may be employed. Also, the depicted operations may be performed in various parallel and/or sequential combinations.

At a block 502, a wireless signal is received at a first hardware platform. With reference to FIG. 1, this first hardware module may be mixed signal hardware module 102. However, embodiments are not limited to this context.

At a block 504, an analog signal corresponding to the wireless signal is generated within the first hardware module. With reference to FIG. 4, this analog signal may be analog signal 252. However, embodiments are not limited to this example.

Also within the first hardware module, the analog signal is converted into a digital signal at a block 506. In the context of FIG. 4, this conversion may be performed by ADC module 204. However, embodiments are not limited to these examples.

Following this conversion, channel filtering of the digital signal is performed at a block 508. As shown in FIG. 4, this also occurs within the first hardware module. Also, as described herein, this channel filtering may involve performing automatic gain control operations to regulate the level of the filtered digital signal.

In turn, the filtered digital signal may be resampled within the first hardware module at a block 510. As a result, a resampled digital signal (e.g., signal 450) is produced. In embodiments, the resampling may be to a lower rate. Also, this resampling may be based on an oscillator signal generated locally within the first hardware module.

At a block 512, the resampled digital signal may be transferred across an interface (such as interface 106) from the first hardware module to a second hardware module. Within the context of FIG. 1, the second hardware module may be digital hardware module 104. However, embodiments are not limited to this context.

At a block 514, the second hardware module may correct sampling rate errors in the resampled digital signal. Referring to FIG. 4, such corrections may be performed by subsequent digital resampling module 404.

Following such corrections, the second hardware module may demodulate the signal into one or more symbols at a block 516. This may be performed by demodulation module 403.

As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing module, computing module, computing device, processing device, computing system, processing system, computer, processor, or the like, and may be implemented using any suitable combination of hardware and/or software.

The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

While various embodiments of the present invention have been described above, it should be understood that they have been presented by way of example only, and not in limitation. For instance, the techniques discussed herein are not limited to the reception and processing of DVB-T and DMB-T/H signals. Thus, embodiments are not limited to these signals. Also, embodiments may employ signals other than OFDM signals (e.g., single carrier signals). Moreover, embodiments are not limited to digital video implementations.

Further, the techniques described herein may be employed with next generation digital television standards, such as DVB-T2, which is currently under development. DVB-T2 provides features (e.g., multiple-input multiple-output (MIMO), multiple-input single-output (MISO), low-density parity-check code (LDPC), and so forth). The implementation features and allocations between hardware modules that are described herein may be employed for such next generation digital television standards.

Accordingly, it will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

The invention claimed is:

1. An apparatus, comprising:
a first hardware module to convert an analog signal corresponding to a wireless signal into a digital signal having a first sampling rate, to perform channel filtering on the digital signal, a first digital resampling module of the first hardware module resamples the filtered digital signal to a second sampling rate, wherein the second sampling rate is lower than the first sampling rate and the first digital resampling module resamples the filtered digital signal based at least in part on a nominal clock recovery module, and to transmit the resampled filtered digital signal to the second hardware module; and
a second hardware module to receive the resampled filtered digital signal, a second digital resampling module of the second hardware module to upsample the resampled filtered digital signal using variable rate adjustments based, at least in part, upon a recovered clock signal and a feedback loop, and to demodulate the upsampled digital signal into one or more symbols.

2. The apparatus of claim 1, wherein the first hardware module is a mixed signal module, and the second hardware module is a digital signal module.

3. The apparatus of claim 1, further comprising an interface coupled between the first and second hardware modules, the interface to transfer the digital signal at the second sampling rate from the first hardware module to the second hardware module.

4. The apparatus of claim 3, wherein the interface comprises a serial interface.

5. The apparatus of claim 4, wherein the serial interface comprises a universal serial bus (USB) interface.

6. The apparatus of claim 1, wherein the second hardware module is to demodulate the digital signal into the one or more symbols in accordance with an orthogonal frequency division multiplexing (OFDM) scheme.

7. The apparatus of claim 1, wherein the first hardware module is to receive the wireless signal.

8. The apparatus of claim 1, wherein the wireless signal is a video signal.

9. The apparatus of claim 1, wherein the first hardware module comprises an oscillator, and wherein the second sampling rate is based on a signal derived from the oscillator.

10. A method, comprising:
at a first hardware module,
converting an analog signal corresponding to a wireless signal into a digital signal having a first sampling rate,
performing channel filtering on the digital signal,
a first digital resampling module of the first hardware module resampling the filtered digital signal to a second sampling rate, wherein the second sampling rate is lower than the first sampling rate and the first digital resampling module resamples the filtered digital signal based at least in part on a nominal clock recovery module, and
transmitting the resampled filtered digital signal to the second hardware module; and
at a second hardware module,
receiving the resampled filtered digital signal,
a second digital resampling module of the second hardware module upsampling the resampled filtered digital signal using variable rate adjustments based, at least in part, upon a recovered clock signal and a feedback loop; and
demodulating the upsampled digital signal into one or more symbols.

11. The method of claim 10, wherein said demodulating is in accordance with an orthogonal frequency division multiplexing (OFDM) scheme.

12. The method of claim 10, further comprising:
transferring the filtered digital signal at the second sampling rate across an interface from the first hardware module to the second hardware module.

13. The method of claim 12, wherein the interface is a serial interface.

14. The method of claim 13, wherein the interface is a universal serial bus (USB) interface.

15. The method of claim 10, wherein the wireless signal is a video signal.

16. The method of claim 10, wherein said resampling is based on a signal derived from an oscillator within the first hardware module.

17. The method of claim 10, wherein said correcting the sampling rate error comprises employing a feedback loop within the second hardware module.

18. An article comprising a computer-readable medium having stored thereon non-transitory instructions that, when executed by a computer processor, cause the computer processor to:
receive a digital signal having a first sampling rate from a mixed signal hardware module, the digital signal corresponding to a wireless signal;
resample the digital signal to a second sampling rate, wherein the second sampling rate is lower than the first sampling rate and based at least in part on a nominal clock recovery module;
upsample the resampled digital signal using variable rate adjustments based, at least in part, upon a recovered clock signal and a feedback loop; and
demodulate the upsampled digital signal into one or more symbols.

19. The article of claim 18, wherein the instructions, when executed by a processor, cause the processor to demodulate the digital signal into the one or more symbols in accordance with an orthogonal frequency division multiplexing (OFDM) scheme.

20. The article of claim 18, wherein the wireless signal is a video signal.

* * * * *